(12) United States Patent
Har Shoshanim et al.

(10) Patent No.: US 6,285,396 B1
(45) Date of Patent: Sep. 4, 2001

(54) GLITCH DETECTOR

(75) Inventors: Daniel Har Shoshanim, D.N. Mizrach Binyamin; Dovid Chechik, D.N. Harei Yehuda, both of (IL)

(73) Assignee: NDS Limited (GB)

(*) Notice: Subject to any disclaimer, the term of this patent is extended or adjusted under 35 U.S.C. 154(b) by 0 days.

(21) Appl. No.: 09/130,574

(22) Filed: Aug. 7, 1998

(30) Foreign Application Priority Data

Aug. 11, 1997 (IL) .......................................... 121521

(51) Int. Cl.[7] .............................. H04N 17/00; H04N 5/21
(52) U.S. Cl. .................. 348/180; 348/181; 348/192; 348/614; 348/473
(58) Field of Search ..................... 348/180, 177, 348/181, 192, 607, 537, 615, 614, 473, 188, 189; 380/2, 210, 217; H04N 17/00, 5/21, 17/02

(56) References Cited

U.S. PATENT DOCUMENTS

| | | | |
|---|---|---|---|
| 3,825,680 | 7/1974 | Verhoeven | 178/7.3 |
| 4,107,651 | 8/1978 | Martin | 340/146 |
| 4,158,855 | 6/1979 | Thomas et al. | 358/127 |
| 4,198,608 | 4/1980 | Comley | 328/162 |
| 4,220,971 | 9/1980 | Lambeth | 358/160 |
| 4,285,004 | * 8/1981 | Morrison et al | 358/10 |
| 4,329,708 | 5/1982 | Yamamoto et al. | 358/36 |
| 4,353,032 | 10/1982 | Taylor | 328/165 |
| 4,419,693 | 12/1983 | Wilkinson | 358/167 |
| 4,495,621 | 1/1985 | Nakagomi et al. | 371/6 |
| 4,586,082 | 4/1986 | Wilkinson | 358/160 |
| 4,590,520 | 5/1986 | Frame et al. | 358/163 |
| 4,698,843 | 10/1987 | Burt et al. | 382/54 |
| 4,807,033 | 2/1989 | Keesen et al. | 358/167 |
| 4,896,213 | * 1/1990 | Kobo et al. | 358/147 |
| 4,897,724 | 1/1990 | Veldhuis | 358/166 |
| 5,113,098 | 5/1992 | Teymouri . | |
| 5,251,026 | 10/1993 | Jeong | 358/105 |
| 5,282,249 | 1/1994 | Cohen et al. | 380/23 |
| 5,363,144 | * 11/1994 | Park | 348/614 |
| 5,386,243 | * 1/1995 | Huang et al. | 348/614 |
| 5,416,600 | 5/1995 | Matsumi et al. | 358/335 |
| 5,481,609 | 1/1996 | Cohen et al. | 380/16 |
| 5,483,292 | * 1/1996 | Ko | 348/614 |
| 5,623,318 | * 4/1997 | Lee | 348/614 |
| 5,623,320 | * 4/1997 | Rim | 348/614 |
| 5,790,133 | * 8/1998 | Holcomb et al. | 345/501 |
| 6,065,072 | * 5/2000 | Flath | 710/29 |

FOREIGN PATENT DOCUMENTS

| | | | |
|---|---|---|---|
| 0 729 280 A2 | 8/1996 | (EP) | H04N/17/00 |
| 0 746 168 A1 | 12/1996 | (EP) | H04N/17/02 |
| 0 746 169 A1 | 12/1996 | (EP) | H04N/17/02 |
| 0757 499 A2 | 2/1997 | (EP) | H04N/17/00 |
| WO 95/24101 | 9/1995 | (WO) | H04N/17/00 |
| WO 96/34294 | 10/1996 | (WO) | G01R/29/26 |

* cited by examiner

*Primary Examiner*—Reinhard J. Eisenzopf
*Assistant Examiner*—Jean W. Désir
(74) *Attorney, Agent, or Firm*—Ladas & Parry

(57) ABSTRACT

A method for detecting glitches in video signals, including the steps of humanlessly sampling pattern information from a frame of video signals, the frame being characterized by known pattern information, comparing sampled pattern information from the frame to the known pattern information, and detecting a glitch if the sampled pattern information differs from the known pattern information.

39 Claims, 4 Drawing Sheets

GLITCH DETECTOR

FIELD OF THE INVENTION

The present invention relates generally to apparatus and methods for detection of temporary interruptions of a television video signal, known as glitches, and particularly to glitch detection for subscriber satellite television transmission.

BACKGROUND OF THE INVENTION

Transmission of television video signals is sometimes momentarily or temporarily interrupted, such interruptions being referred to in the art by the term "glitch". Glitches may be caused by a variety of factors, inter alia, environmental factors such as lightning or weather changes, interference from buildings, electrical/electronic failures during transmission, or satellite communication problems, such as poor placement of satellite dishes or temporary transmission or reception failures. In the case of encrypted transmissions which are deciphered by a decryption key, system "bugs" or failure may prevent reception of the decryption key.

Glitches may be perceived by a viewer as a shaking, blurring, fuzziness, halting, etc., of the picture on the television screen. In subscriber satellite television transmission, glitches can cause further problems. In such subscriber systems, an encrypted television signal is transmitted together with a conditional access stream which contains entitlement control messages (ECM's) which comprise, inter alia, decryption key information. Encrypted systems are described, for example, in U.S. Pat. Nos. 5,282,249 and 5,481,609 to Cohen et al. and assigned to the present assignee, the disclosures of which are incorporated herein by reference. An integrated receiver decoder (IRD) receives the encrypted signal and uses the decryption key information to decode the ECM's which determine whether the viewer is authorized to view the particular broadcast. If a glitch occurs in such an encrypted system, particularly a glitch in the ECM stream, the IRD is unable to interpret the signal and momentarily no picture at all is transmitted to the television set. Depending on the programming of the IRD, the momentary non-transmission of a picture may be perceived as a frozen or blue screen or a scrambled picture.

It is thus readily understood that detecting glitches is an important tool in providing reliable broadcasting service. By detecting glitches, it may be possible to discover their source and eliminate or at least cover up and/or mend the problem.

Glitch detectors are known in the art. U.S. Pat. No. 4,107,651 to Martin describes a glitch detector and circuit for detecting glitches upon a digital signal depending upon the digital signal level and the polarity of subsequent transitions within a discrete sampling period. U.S. Pat. No. 4,198,608 to Comley describes a glitch detector and trap circuit for removing a glitch generated by a D/A converter due to an error in one or more bits of an input digital signal. U.S. Pat. No. 4,353,032 to Taylor describes a system that employs two glitch detectors associated with complementary data signals that can detect either positive-going or negative-going glitches within a sample clock period. U.S. Pat. No. 4,495,621 to Nakagomi et al. describes a glitch detector which recognizes and measures the lengths of glitches by sampling an input signal at fractions of a sampling clock.

Published PCT patent application WO 96/34294 describes a method for non-invasively testing performance of a digital communication system. The test system takes advantage of information typically generated by digital receivers to correct for communication channel imperfections.

Other published patent documents attempt to detect glitches by transmitting a known test pattern which is viewed at the receiving end, any glitches in the received test pattern being readily detectable. An example of such art is Published PCT patent application WO 95/24101 which describes apparatus for creating video test patterns for outputting to a video test pattern generator, which test pattern is displayed to an operator in picture representation which simulates the appearance of a test pattern when displayed on a television receiver. European Patent Application EP 729280 A2 describes a transmission monitoring system which receives a test signal from a given source and provides a feedback indicative of the received test signal to the source via a standard voiceband telephone connection. EP 746168 A1 describes a test pattern generator which generates a test pattern that can be visually inspected by a test engineer to determine whether or not certain lines of the test pattern are being properly decoded by a television signal decoder. EP 746169 A1 describes a test pattern suitable for a television signal decoder which detects changes in the color content of a signal from frame to frame, and on the basis of these changes modulates certain parameters, such as attenuation of high frequency illuminance components. EP 757499 A2 describes a method of testing a compressed digital television signal decoder with a signal analyzer that checks whether the decoder provides an expected signature of bits from a test bit stream.

However, the above cited prior art does not provide a glitch detector for automatically detecting glitches in a test pattern that can efficiently be used for subscriber satellite television transmission.

SUMMARY OF THE INVENTION

The present invention seeks to provide improved apparatus and methods for glitch detection, particularly to glitch detection for subscriber satellite television transmission, both for analog and digital television signals.

The present invention employs a video inserter which generates and inserts a test pattern into a video transmission, particularly video for broadcasting to viewers, which can be multiplexed to a plurality of IRD's. A glitch detector can simultaneously sample and compare each video frame produced by each of the IRD's with a known pattern at a known time. A glitch is considered detected if the pattern differs from the known pattern. One particular feature of the present invention is that the video inserter can generate a dynamic test pattern which is particular useful with MPEG systems, as will be described in detail hereinbelow. Preferably a glitch is detected if the sampled pattern does not change in accordance with the known way that the known pattern changes.

It is known in the art that the uppermost and lowermost lines of home-user television screens are not generally viewable. Another particular feature of the present invention is to exploit this fact and send the test pattern on these "dead" lines of the television screen.

Unlike the prior art, the glitch detector of the present invention is capable of simultaneously monitoring pattern information from a multiplicity of channels comprising the video signals.

There is thus provided in accordance with a preferred embodiment of the present invention a method for detecting glitches in video signals, including the steps of humanlessly sampling pattern information from a frame of video signals, the frame being characterized by known pattern information, comparing sampled pattern information from the frame to the known pattern information, and detecting a glitch if the sampled pattern information differs from the known pattern information.

In accordance with a preferred embodiment of the present invention the method also includes modifying the known pattern information from one the frame to another the frame, and wherein the step of detecting includes detecting a glitch if the sampled pattern information does not change in accordance with the modifying of the known pattern information.

Further in accordance with a preferred embodiment of the present invention the method includes modifying the known pattern information from one the frame to another the frame so as to at least partially prevent diminishment of data of the known pattern information due to video compression. Preferably the known pattern information is generated by inserting a test pattern into the video signals.

Additionally in accordance with a preferred embodiment of the present invention the method includes transmitting the test pattern on a television channel actually being viewed.

Still further in accordance with a preferred embodiment of the present invention the step of sampling includes simultaneously sampling pattern information from a multiplicity of channels including the video signals. Preferably the known pattern information is identical for each of the multiplicity of channels.

In accordance with a preferred embodiment of the present invention the steps of comparing and detecting are performed on multiple lines of video signals being transmitted to a television screen.

Further in accordance with a preferred embodiment of the present invention the steps of comparing and detecting are performed on at least one "dead" line of video signals being transmitted to a television screen, the at least one dead line not being visible to a viewer of the screen.

There is also provided in accordance with a preferred embodiment of the present invention a changing test pattern transmitted on a frame of video signals, wherein the test pattern changes from one the frame to another the frame.

There is also provided in accordance with a preferred embodiment of the present invention a video inserter including a pulse separator which separates an input video signal into vertical and horizontal synchronization signals, programmable apparatus which inserts a test pattern into a video signal, and an output circuit which outputs the video signal with the test pattern to a multiplicity of channels.

There is also provided in accordance with a preferred embodiment of the present invention a glitch detector including a sampler which samples pattern information from a frame of video signals, and a comparator which compares sampled pattern information from the frame to known pattern information.

In accordance with a preferred embodiment of the present invention the sampler simultaneously samples the pattern information from a plurality of the frames. Preferably the frames are associated with a plurality of channels.

BRIEF DESCRIPTION OF THE DRAWINGS

The present invention will be understood and appreciated more fully from the following detailed description, taken in conjunction with the drawings in which.

DETAILED DESCRIPTION OF A PREFERRED EMBODIMENT

Figure 1:
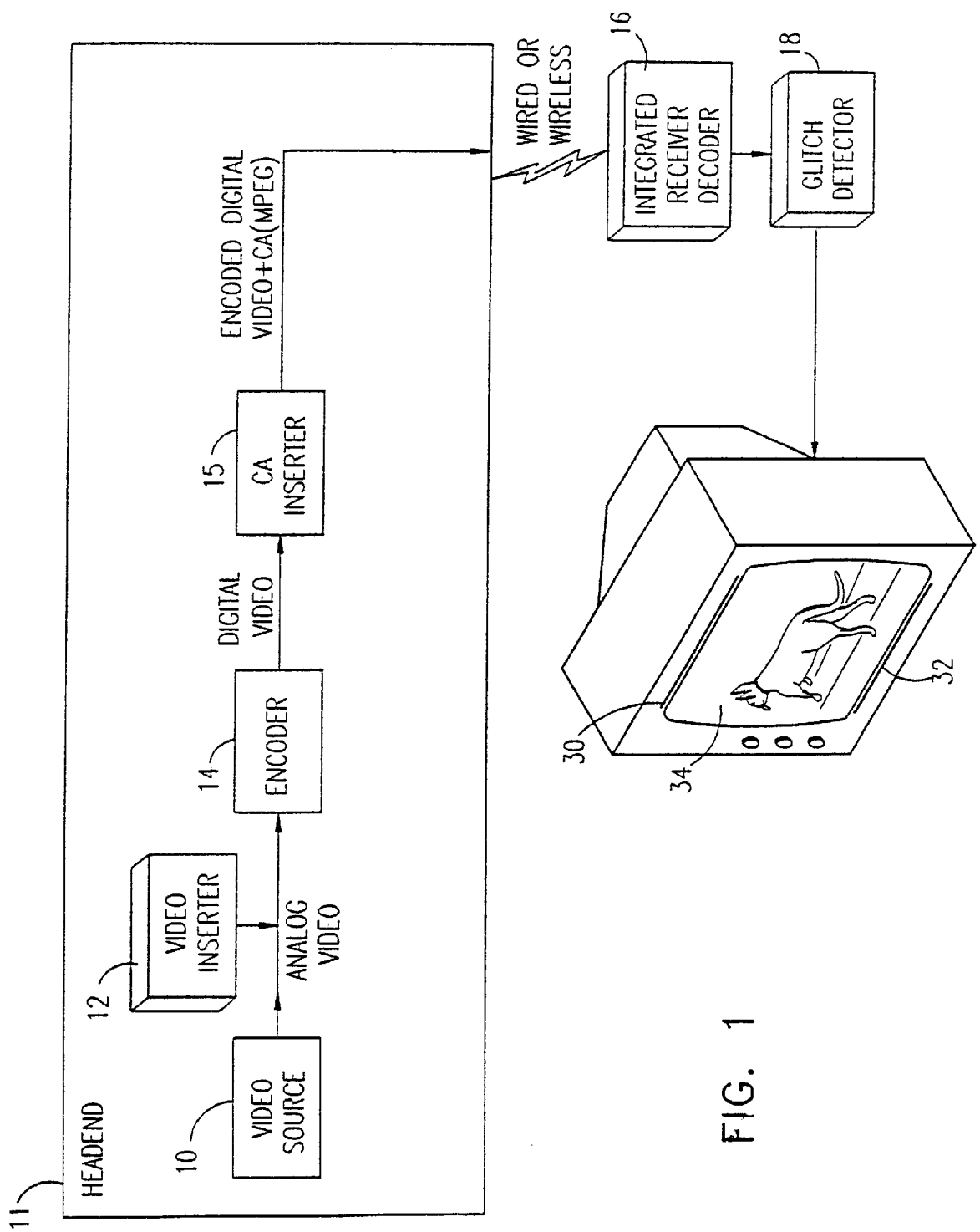
FIG. 1 is a simplified, partial pictorial, partial block diagram illustration of a glitch detector system, constructed and operative in accordance with a preferred embodiment of the present invention.

Reference is now made to FIG. 1 which illustrates a glitch detector system, constructed and operative in accordance with a preferred embodiment of the present invention. Video signals are provided from a video source 10, such as, but not limited to, a laser disk, VCR, video camera and the like.

In accordance with a preferred embodiment of the present invention, and as will be described in detail further hereinbelow with reference to FIG. 2, a video inserter 12 inserts a test pattern into the video signals, typically analog, provided by video source 10. An encoder 14 then preferably encodes the video signals and outputs digital video signals. A conditional access inserter 15 preferably inserts entitlement control messages (ECM's), thereby producing a conditional access stream which contains, inter alia, ECM's, decryption key information and encoded digital video signals. A head-end 11 may typically house video source 10, video inserter 12, encoder 14 and conditional access inserter 15.

Conditional access inserter 15 may output the conditional access stream with the encoded digital video signals by means of digital video compression, such as in accordance with the MPEG standard. As is known in the art, MPEG (short for Moving Picture Experts Group) refers to a family of digital video compression standards. MPEG files can be decoded by special hardware or software. MPEG attains a high compression rate by storing only the changes from one frame to another, instead of each entire frame. Although some data is removed during compression, the diminishment of data is generally imperceptible to the human eye. MPEG employs statistical multiplexing, i.e., it allocates the entire bandwidth of a communications channel based on the need of the shared users of the channel at the time of transmission.

The digital video signals, typically in MPEG format, are transmitted to an integrated receiver decoder (IRD) 16. Preferably the video signals are multiplexed to a plurality of IRD's 16. The video signals may be transmitted by any type of transmission, such as satellite, cable, or terrestrial communications, including digital terrestrial. Each IRD 16 uses the decryption key information sent with the video signals to decode the video signals and outputs analog video signals in the form of video frames, which can be viewed on a television screen. IRD 16 preferably operates in accordance with standard industry protocols, although proprietary protocols may be employed instead. A glitch detector 18 samples/monitors the video frames produced by IRD 16 and detects any pattern changes in these frames, which changes are indicative of a glitch, as will be described in detail further hereinbelow with reference to FIG. 3. Glitch detector 18 is preferably capable of simultaneously monitoring all of the IRD's 16.

Figure 2:
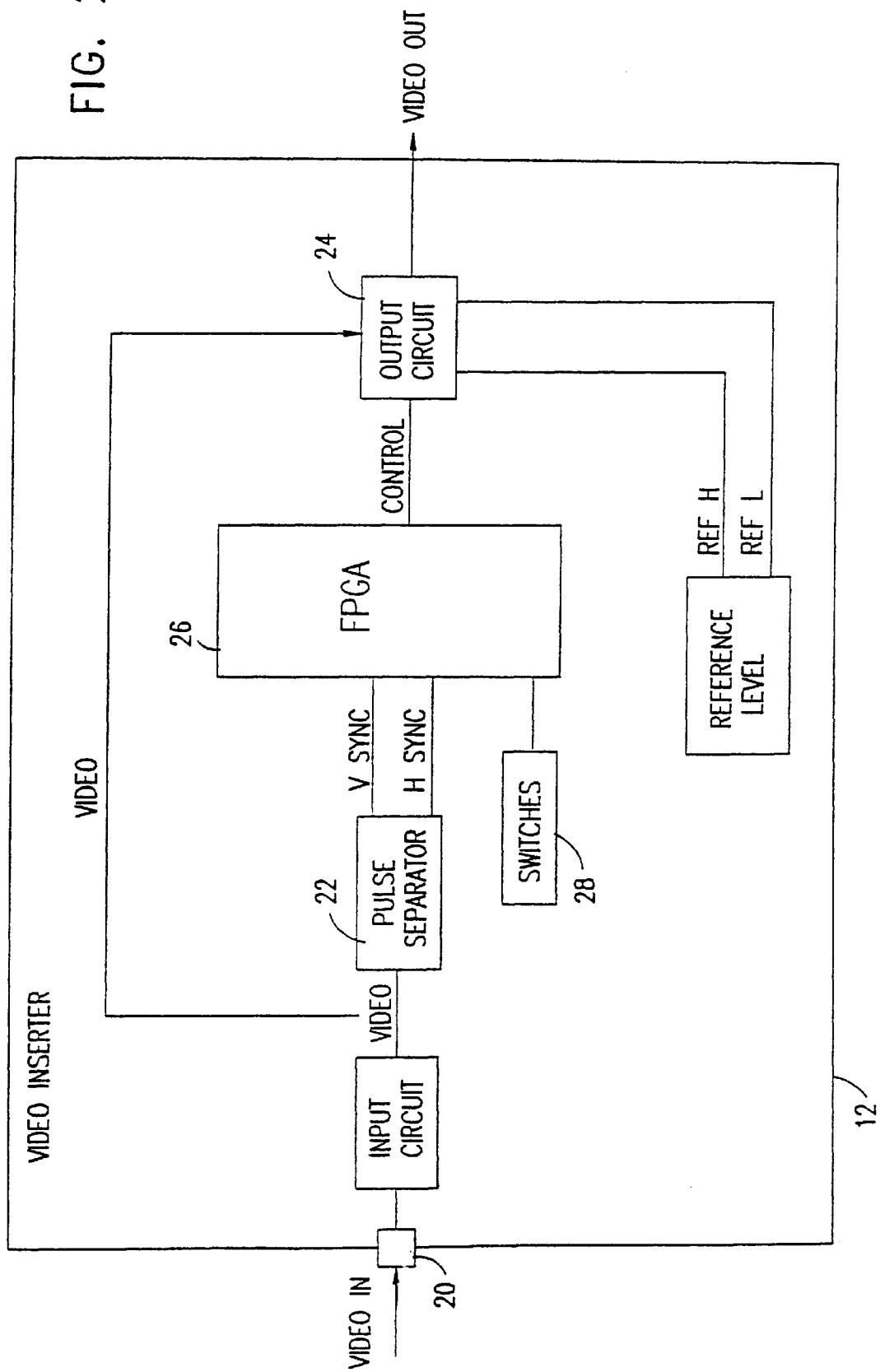
FIG. 2 is a simplified block diagram illustration of a video inserter which inserts test patterns in the glitch detector system of FIG. 1, constructed and operative in accordance with a preferred embodiment of the present invention.

Reference is now made to FIG. 2 which is a simplified block diagram illustration of video inserter 12. An input video signal is input into video inserter 12, such as via a coaxial connector 20. Connector 20 preferably has a parallel resistor to provide input impedance. The input video signal is then split, one portion preferably going to a pulse separator 22 which provides vertical and horizontal synchronization signals. The other portion preferably goes to an output multiplexing and buffer circuit 24. The vertical and horizontal synchronization signals preferably go to a field programmable gate array (FPGA) 26 which controls timing for the output multiplexer and buffer operation. The particular mode of operation may be selected and/or fixed by switches 28, such as DIP switches. FPGA 26 inserts a specific test pattern into the video signal, which pattern is determined by the switch settings. Besides the video input into output circuit 24, one or more reference signals are also input thereto.

Since most of the time NPEG only stores the changes from one frame to another and only periodically sends a full picture, a non-changing test pattern is transmitted quite compressed. Here the diminishment of data is undesirable because for glitch detection it is important to have as much data as possible. In accordance with a preferred embodiment of the present invention, video inserter 12 creates a test pattern which is purposely modified, constantly or at least partially constantly from frame to frame, so that MPEG will use more bandwidth to transmit the data stream of the test pattern. In this way, all elements comprising the television transmission are active, so that glitch detector 18 can efficiently and reliably detect glitches that could occur due to malfunction of any element that makes up the television transmission. The test pattern may include a colored pattern or any other pattern, and may include an audio portion as well.

It is known in the art that the uppermost and lowermost lines of home-user television screens are not generally viewable. Two "dead" lines are designated by numerals 30 and 32 on a television screen 34 in FIG. 1. Another particular feature of the present invention is to send the test pattern on one or more "dead" lines, preferably a plurality thereof, of home television screen 34. Glitch detector 18 can thus check for glitches on multiple lines, particularly dead lines, of television signals transmitted to screen 34. Thus, in contrast with the prior art, the present invention transmits the test pattern on a "live" channel, i.e., a channel actually being viewed. This provides synergistic benefits: the actual live channel is monitored for glitches and the test pattern is not wastefully sent on another non-viewed channel. The test pattern does not interfere with the viewer's enjoyment because it is sent on the dead lines.

Figure 3:
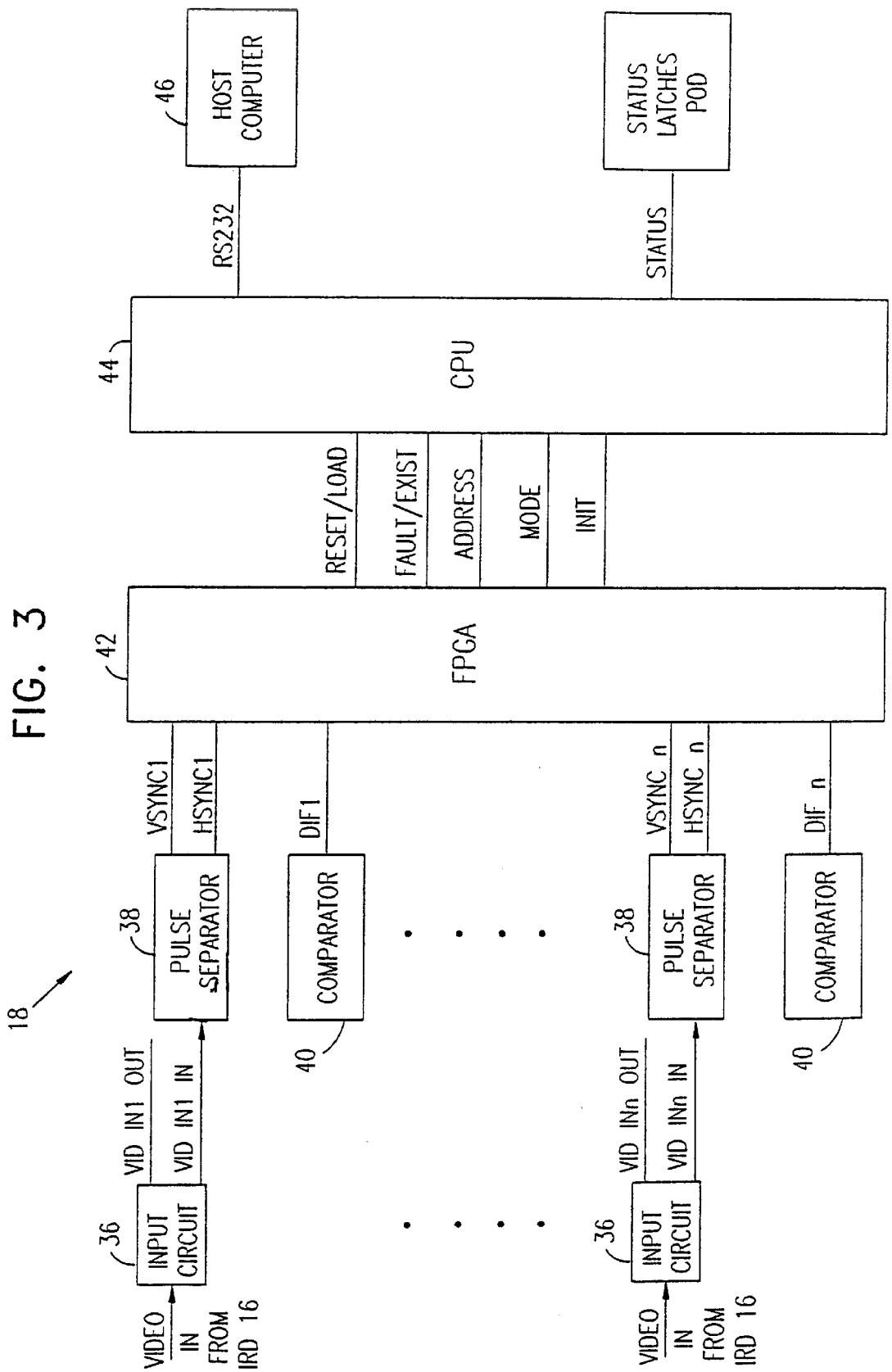
FIG. 3 is a simplified block diagram illustration of the glitch detector system of FIG. 1.

Reference is now made to FIG. 3 which is a simplified block diagram illustration of glitch detector 18. Glitch detector 18 is capable of simultaneously monitory a multiplicity of channels. The video information signal from each IRD 16 channel is input into an input circuit 36 which preferably splits the video signal to a pulse separator 38, which provides vertical and horizontal synchronization signals, and to a comparator 40. Comparator 40 and the vertical and horizontal synchronization signals from pulse separator 38 preferably go to an FPGA 42. Information from FPGA 42 is sent to and processed by a CPU 44.

The video signals are preferably sampled by pulse separator 38 and comparator 40 in two stages. One stage simply verifies and identifies connection and operation of each channel, wherein the synchronization pulses are sampled. If no activation is detected, that particular channel is declared to be not in use. Alternatively, the very fact that no activation is detected may be defined as a glitch. After the first stage, the channels are sampled a second time, this being the test cycle.

Figure 4:
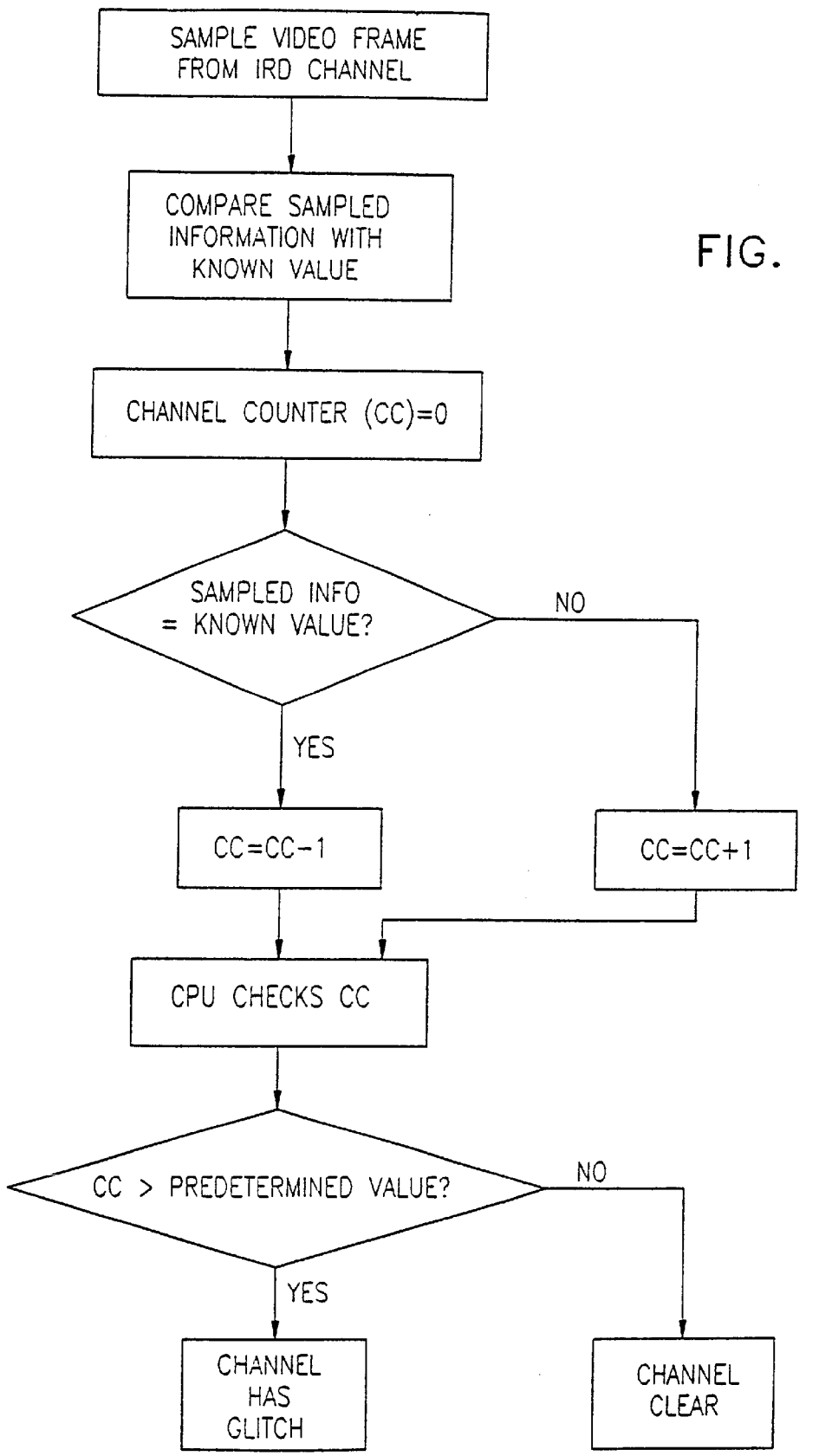
FIG. 4 is a simplified flow chart of a test cycle of the glitch detector of FIG. 1.

Reference is now made to FIG. 4 which is a simplified flow chart of the test cycle of glitch detector 18. The sampled information from each frame is compared with a known value. A channel counter (CC in FIG. 4) is initialized. If the sampled information is the same as the known value, the channel counter is decremented; if not equal, the channel counter is incremented. After each frame, or alternatively after a given number of frames, CPU 44 checks the channel counter. If the channel counter is greater than a predetermined value, the channel has a glitch; otherwise, the channel is clear. CPU 44 may send its processed information to a host computer 46 (FIG. 3) for displaying and/or logging the channel status and glitch information.

It will be appreciated by persons skilled in the art that the present invention is not limited by what has been particularly shown and described hereinabove. Rather the scope of the present invention includes both combinations and subcombinations of the features described hereinabove as well as modifications and variations thereof which would occur to a person of skill in the art upon reading the foregoing description and which are not in the prior art.

What is claimed is:

1. A method for detecting glitches in video signals, comprising:

humanlessly sampling pattern information from a frame of video signals, said frame being characterized by known pattern information and also comprising a video signal from a video source;

comparing sampled pattern information from said frame to said known pattern information; and detecting a glitch if said sampled pattern information differs from said known pattern information.

2. The method according to claim 1 and comprising modifying said known pattern information from one said frame to another said frame, and wherein said step of detecting comprises detecting a glitch if said sampled pattern information does not change in accordance with said modifying of said known pattern information.

3. The method according to claim 1 and comprising generating said known pattern information by inserting a test pattern into said video signals.

4. The method according to claim 1 and wherein said step of sampling comprises simultaneously sampling pattern information from a multiplicity of channels comprising said video signals.

5. The method according to claim 1 and wherein the steps of comparing and detecting are performed on multiple lines of video signals being transmitted to a television screen.

6. The method according to claim 1 and wherein the steps of comparing and detecting are performed on at least one "dead" line of video signals being transmitted to a television screen, said at least one dead line not being visible to a viewer of said screen.

7. The glitch detector according to claim 1 and wherein the video signal from the video source does not comprise the known pattern information.

8. The method according to claim 3 and comprising transmitting said test pattern on a television channel actually being viewed.

9. The method according to claim 4 and wherein said known pattern information is identical for each of said multiplicity of channels.

10. A method for detecting glitches in video signals comprising:

humanlessly sampling pattern information from a frame of video signals, said frame being characterized by known pattern information and also comprising a video signal from a video source;

comparing sampled pattern information from said frame to said known pattern information;

detecting a glitch if said sampled pattern information differs from said known pattern information; and modifying said known pattern information from one said frame to another said frame so as to at least partially prevent diminishment of data of said known pattern information due to video compression.

11. The method according to claim 10 and wherein said video compression comprises MPEG compression.

12. A changing test pattern transmitted on a frame of video signals, said test pattern comprising known pattern information and also comprising a video signal from a video source, wherein said test pattern changes from one said frame to another said frame so as to at least partially prevent diminishment of data of said known pattern information due to video compression.

13. The changing test pattern according to claim 12 and wherein the video signal from the video source does not comprise the known pattern information.

14. A video inserter for inserting a test pattern into an input video signal, the video inserter comprising:

input apparatus for receiving an input video signal;

a pulse separator which separates said input video signal into vertical and horizontal synchronization signals;

programmable apparatus which inserts a test pattern into the input video signal to produce an output signal comprising the input video signal and the test pattern; and an output circuit which outputs said output signal.

15. The video inserter according to claim 14 and wherein the output circuit outputs said output signal to a multiplicity of channels.

16. The video inserter according to claim 14 and wherein said programmable apparatus comprises a programmed FPGA.

17. A glitch detector comprising:

a sampler which humanlessly samples pattern information from a frame of video signals, said frame being characterized by known pattern information and also comprising a video signal from a video source;

a comparator which compares sampled pattern information from said frame to said known pattern information; and a glitch detecting unit which detects a glitch if said sampled pattern information differs from said known pattern information.

18. The glitch detector according to claim 17 wherein said sampler simultaneously samples said pattern information from a plurality of said frames.

19. The glitch detector according to claim 12 and wherein the video signal from the video source does not comprise the known pattern information.

20. The glitch detector according to claim 18 wherein said frames are associated with a plurality of channels.

21. A method for detecting glitches in input video signals that comprise known pattern information which is modified from one frame of said input video signal to another frame of said input video signals so as to at least partially prevent diminishment of data of said known pattern information due to video compression, said input video signals also comprising a video signal from a video source, the method comprising:

sampling, from said input video signals, pattern information that corresponds to said known pattern information, thereby producing sampled pattern information;

comparing said sampled pattern information to said known pattern information; and detecting a glitch in said input signal if said sampled pattern information differs from said known pattern information.

22. The method according to claim 21 and wherein the video signal from the video source does not comprise the known pattern information.

23. The method according to claim 21 and wherein said comparing comprises automatically comparing said sampled pattern information to said known pattern information.

24. The method according to claim 21 and wherein said sampling comprises simultaneously sampling pattern information from a multiplicity of channels at which said input video signals are provided.

25. The method according to claim 21 and wherein the steps of comparing and detecting are performed on input video signals corresponding to a plurality of television display lines.

26. The method according to claim 21 and wherein the steps of comparing and detecting are performed on input video signals corresponding to at least one "dead" television display line.

27. The method according to claim 21 and wherein said detecting comprises detecting a glitch in said input video signals if said sampled pattern information does not change in accordance with modification of said known pattern information.

28. The method according to claim 24 and wherein said known pattern information is identical for each of said multiplicity of channels.

29. A testing method for enabling detection of glitches in input video signals, the testing method comprising:

transmitting, from a transmitting end, input video signals comprising known pattern information and also comprising a video signal from a video source, said known pattern information being modified from one frame of said input video signals to another frame of said input video signals so as to at least partially prevent diminishment of data of said known pattern information due to video compression;

receiving said input video signals at a receiving end;

sampling, from said input video signals received at the receiving end, pattern information that corresponds to said known pattern information, thereby producing sampled pattern information;

comparing said sampled pattern information to said known pattern information; and detecting a glitch in said input video signals if said sampled pattern information differs from said known pattern information.

30. The method according to claim 29 and wherein the video signal from the video source does not comprise the known pattern information.

31. A method for generating a test pattern for use in detection of glitches in video signals comprising a video signal from a video source, the method comprising:

inserting known pattern information in said video signal from said video source;

modifying said known pattern information from one frame of said video signals to another frame of said video signals so as to at least partially prevent diminishment of data of said known pattern information due to video compression; and outputting said known pattern in formation modified from one frame of said video signals to another frame of said video signals.

32. The method according to claim 31 and wherein said video compression comprises compression according to an MPEG format.

33. A glitch detector comprising:
- a receiver operative to receive input video signals that comprise pattern information corresponding to known pattern information which is modified from one frame of said input video signals to another frame of said input video signals so as to at least partially prevent diminishment of data of said known pattern information due to video compression, said input video signals also comprising a video signal from a video source;
- a sampler operatively associated with the receiver and operative to sample said pattern information corresponding to said known pattern information thereby producing sampled pattern information; and
- a comparator operatively associated with the sampler and operative to compare said sampled pattern information to said known pattern information and to output an output indicating existence of a glitch if said sampled pattern information differs from said known pattern information.

34. The glitch detector of claim 33 and wherein the video signal from the video source does not comprise the known pattern information.

35. The glitch detector according to claim 33 and wherein said sampler is operative to simultaneously sample said pattern information from a plurality of said frames.

36. The glitch detector according to claim 35 wherein said frames are associated with a plurality of channels.

37. A video inserter comprising:
- programmable apparatus operative to insert known pattern information in video signals from a video source and to modify said known pattern information from one frame of said video signals to another frame of said video signals so as to at least partially prevent diminishment of data of said known pattern information due to video compression; and
- an output circuit operatively associated with said programmable apparatus and operative to provide an output of said video signals which includes said known pattern information modified from one frame of said video signals to another frame of said video signals.

38. A testing system for enabling detection of glitches in video signals, the system comprising:
- a transmitting unit operative to transmit video signals comprising known pattern information and also comprising a video signal from a video source, said known pattern information being modified from one frame of said video signals to another frame of said video signals so as to at least partially prevent diminishment of data of said known pattern information due to video compression; and
- a receiving unit comprising:
  - a receiver operative to receive said video signals;
  - a sampler operatively associated with said receiver and operative to sample, from said video signals received at the receiver, pattern information that corresponds to said known pattern information thereby producing sampled pattern information; and
  - a comparator operatively associated with said sampler and operative to compare said sampled pattern information to said known pattern information and to output an indication of existence of a glitch if said sampled pattern information differs from said known pattern information.

39. The testing system according to claim 38 and wherein the video signal from the video source does not comprise the known pattern information.

* * * * *

UNITED STATES PATENT AND TRADEMARK OFFICE
CERTIFICATE OF CORRECTION

PATENT NO.    : 6,285,396 B1                                              Page 1 of 1
DATED         : September 4, 2001
INVENTOR(S)   : Har Shoshanim et al.

It is certified that error appears in the above-identified patent and that said Letters Patent is hereby corrected as shown below:

Column 6,
Line 53, "glitch detector" should read -- method --.

Column 7,
Line 51, "claim 12" should read -- claim 17 --.

Signed and Sealed this

Thirtieth Day of July, 2002

Attest:

Attesting Officer

JAMES E. ROGAN
Director of the United States Patent and Trademark Office